United States Patent [19]

Morin

[11] Patent Number: 4,899,484

[45] Date of Patent: Feb. 13, 1990

[54] HUMANE ANIMAL TRAP

[76] Inventor: Marcel Morin, P.O. Box 53, Falher, Alberta, Canada, T0H 1M0

[21] Appl. No.: 353,488

[22] Filed: May 18, 1989

[51] Int. Cl.⁴ ............................................. A01M 23/20
[52] U.S. Cl. ......................................................... 43/61
[58] Field of Search ................................. 43/60, 61, 74

[56] References Cited

U.S. PATENT DOCUMENTS

| | | | |
|---|---|---|---|
| 1,779,300 | 10/1930 | Weatherly | 43/60 |
| 2,586,110 | 2/1952 | Stilborn | 43/61 |
| 3,834,063 | 9/1974 | Souza et al. | 43/61 |

FOREIGN PATENT DOCUMENTS 110577  3/1967  Norway ................................. 43/61

Primary Examiner—M. Jordan
Attorney, Agent, or Firm—Jones, Tullar & Cooper

[57] ABSTRACT

This invention relates to a method and apparatus for the trapping of animals in a humane manner whereby the animal is not injured during the trapping process, nor is it subject to injury following trapping. The trap comprises an elongate chamber having a top, bottom and two sides, and end covers which are in the form of slidable doors. The floor of the chamber includes a pair of hinged panels which are in a slightly raised position when the trap is set. A link system projects upwardly through an opening in the top of the chamber and is attachable to the trap's triggering mechanism. The trap is generally set by lockingly engaging the end covers in a raised position and engaging the link system with the trigger mechanism. When an animal enters the trap and steps upon the raised floor panels, the triggering mechanism is actuated which unlocks the end panels from their raised position and permits them to drop to a closed position, thereby safely entrapping the animal within the chamber.

10 Claims, 3 Drawing Sheets

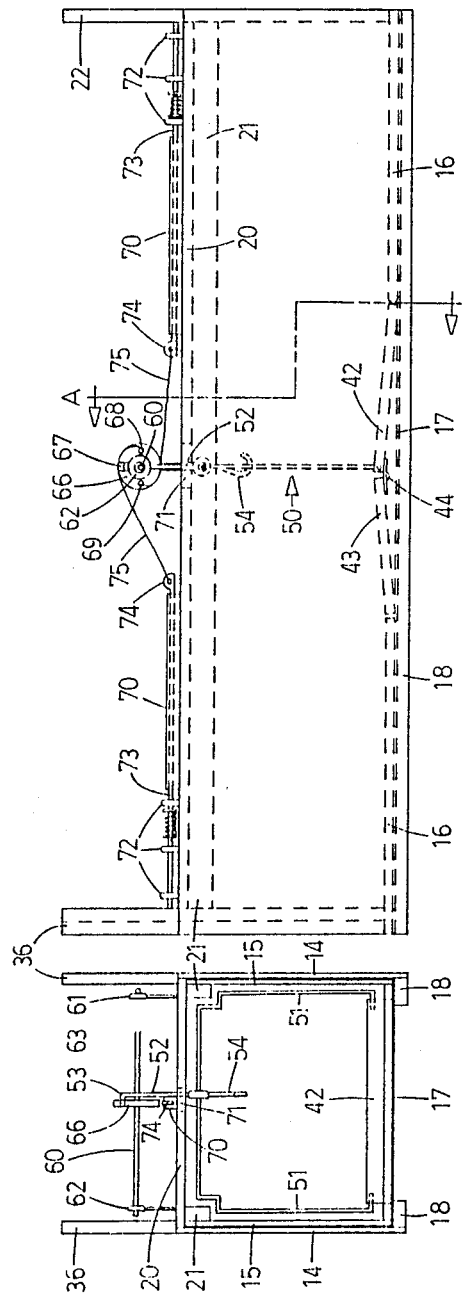

HUMANE ANIMAL TRAP

This invention relates to animal traps and more particularly to an animal trap in which the entrapped animal is not injured during the trapping process, and is not subject to injury following trapping.

BACKGROUND OF THE INVENTION

It has long been a requirement to develop a humane animal trap. There are occasions in which it is necessary to catch and hold safe animals of various species For example, it is sometimes necessary to trap wild animals which have entered into areas which are not safe for them. Other times, animals such as skunks may wander into garages or yards and become a hinderance to the property owner. In applications such as these, it is imperative that any trap which is used does not pose a threat to domestic animals and pets or to unsuspecting children.

SUMMARY OF THE INVENTION

The trap of the present invention provides a safe and sure means of trapping animals without causing them any injury. To this end, the trap includes an elongate chamber having a top, bottom and two sides. End covers in the form of slidable doors are provided. One or both doors may be arranged so as to slide from a raised open position to a lowered, closed position.

The floor of the chamber includes a pair of panels hinged together centrally of the chamber. A connection is provided between the hinge and outside of the chamber via a link which passes through a suitable opening in the top. A trigger mechanism is arranged on top of the chamber. The mechanism includes a shaft positioned laterally and rotatably secured to the top by means of a pair of suitable fasteners. A spring is arranged between one fastener and the shaft. A disc is attached to the shaft and is free to rotate therewith. The disc includes a detent on an outer edge and a pair of holes arranged near the outer edge being diametrically opposed and arranged, approximately 90° from the detent At rest, the detent is positioned in a horizontal plane and the holes are in a vertical plane.

A flexible connection is attached to at least one of the holes and at the opposite end to a locking means adapted to releasably engage a door in an open position. In this position, the flexible connector is pulled taut. The upper end of the link terminates in a loop type arrangement adapted to rest in the detent.

In accordance with a second aspect of the invention, there is provided a method of setting a trap for trapping animals untilizing an animal trap comprising an elongate chamber having a top, a bottom and a pair of sides, a pair of end covers at least one of which is slidable vertically between a raised open position and a lowered closed position, a floor including a pair of panels centrally hinged, link means attached to the hinge of the panels and projecting upwardly through an opening in the top, trap setting means including a shaft laterally disposed on the top, the shaft rotatably connected to a pair of fastening means, a disc attached to the shaft and located over the link means, spring means attached to the shaft and one of the fastening means, the disc including a circumferentially located detent, and a pair of diametrically opposed holes arranged 90° to the detent, at least one locking means releasably attached to at least one of the end covers in a raised position, the locking means attached to one of the holes in the disc by a flexible attachment, and a connecting loop joined to the link means, and adapted to rest in the detent when the detent is in a vertically uppermost position, the method comprising the steps of: placing bait on the floor panels; advancing the disc through 90° so that the detent is upwardly positioned, raising the link means thereby raising the floor panels; placing the connecting loop in the detent; and upwardly sliding at least one of the end covers and lockingly engaging the associated locking means thereto.

BRIEF DESCRIPTION OF THE DRAWINGS

The invention will now be described in greater detail with reference to the attached drawings wherein:

FIG. 3 is a side elevational view of the chamber; and

FIG. 4 is a cross-sectional view of the chamber as depicted by section lines A—A in FIG. 3.

DESCRIPTION OF THE PREFERRED EMBODIMENT

Figure 1:
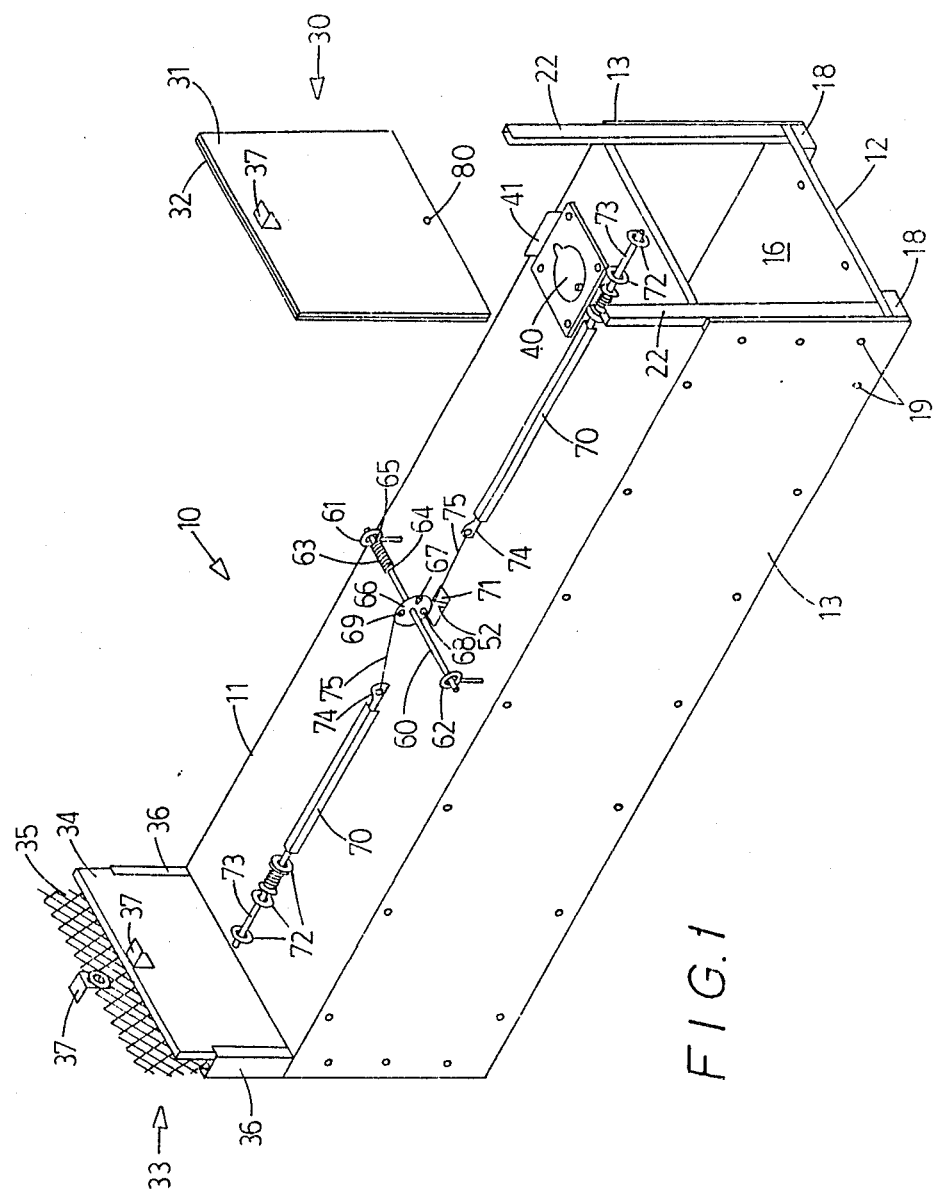
FIG. 1 is a perspective view of the drawings.

Referring now to FIG. 1, the chamber as illustrated generally at 10 includes top 11, bottom 12 and sides 13. As will be noted in greater detail in FIG. 2, the sides include outer panels 14 and inner panels 15. The bottom 12 includes inner panel 16. Arranged between side panels 14 and 15 and below bottom panel 16 is a formed metal layer 17 which serves to render the chamber 10 gnaw proof. Skids 18 arranged on the outer edges of bottom 12 serve to hold the unit together. The panels are fastened together by suitable means such as wood screws 19. The top 11 includes panel 20 and a pair of support strips 21.

As illustrated in FIG. 1 a pair of vertical channels 22 are attached along each side of one end. An end cover or door 30 is free to slide up and down in channels 22. Door 30, as shown, comprises an outer panel 31 and an inner metal sheet 32. An alternative cover 33 is shown at the opposite end of the chamber 10. This cover comprises an inner door 34 and an outer mesh door 35. The two doors are free to slide up and down in double channels 36, independent of each other. Thus, door 34 can be raised to permit observation of the inside of the chamber 10 while preventing egress of animals therefrom. It is to be understood that the chamber 10 may be provided with one of each type of door or any combination therof.

Handle means 37 are provided in the doors to assist in raising or lowering thereof. Although the chamber 10, when closed by the two end doors 30 and 33 is secure, it is not so well sealed as to cut off supply of air to the inside.

Opening 40 in the top of chamber 10 provides a small port to the interior for the purpose of providing a supply of food or water to animals trapped therein. The opening 40 is covered by slide 41. This port may also be used to introduce substances for the purposes of debilitating animals therein.

The trigger mechanism is shown in FIGS. 1, 3 and 4. The bottom 16 preferably includes a pair of panel members 42 and 43 formed together by hinge means 44. The panels 42 and 43 rest on the metal layer 17 but may be raised as by lifting at the hinge joints. This results in a slightly raised center portion as long as the center is held in a lifted position. A link means 50 is attached at or near the center of panels 42 and 43. This means includes a pair of rods 51 or the like which are positioned close to the inner side walls 15, as shown in FIG. 4, and cross over to the center where they join just below the inner top of the chamber. A single rod or link pin 52 exits through a small opening 71 in the top 20. Thus, by pulling up on the link means 50 the panels 42 and 43 in the center of the floor are raised, and conversely a force on either of the raised panels 42 o 43 causes the link means 50 to drop downwarldy.

The balance of the trigger mechanism is located on the top of the chamber. Rod or shaft 60 is positioned laterally and is rotatably supported by fastening means 61 and 62. Biasing means in the form of coil spring 63 surrounds the shaft and is connected at one end 64 to the shaft and at the other end 65 to the fastener 61. Disc 66 is secured to the shaft 60 and is free to rotate therewith. The disc 66 which is illustrated as being circular is approximately 2" in diameter. It is to be understood that alternative sizes and shapes could be used.

Disc 66 includes detent 67 located in the outer surface thereof. Holes 68 and 69 are also provided in the disc 66. The holes, as illustrated, are diametrically opposed and are positioned approximately 90° from the detent. In the normal position, the detent faces one end of the chamber 10 and the holes are aligned vertically. This relationship will be discussed further hereafter.

Support channels 70 rest longitudinally on the top 11 of the chamber 10. A gap or small opening 71 is provided at the location where the link pin 52 projects through the top 11. It will be noted that the gap 71 is also located beneath the disc 66. One or more guide loops 72 are located at each end of the support channel 70. Lock pins 73 rest in the channel and slidably project through guide loops 72. The lock pins 73 are adapted to project beyond the end of the top 11. The inner end 74 of each lock pin 73 is attached to a flexible connector 75 such as a wire or strong string (for example a length of fishing line). The opposite end of each flexible connector 75 is secured (not necessarily as shown) to the disc 66 by means of an appropriate hole 68 or 69. The flexible connectors or strings 75 are of an appropriate length such that when the disc 66 is in its normal position, i.e., the holes are aligned vertically, the lock pins 73 will extend to a position just short of the ends of the chamber.

The inner face of each end cover or door 30 or 33 is provided with a suitable means such as a hole 80, to lockingly engage a lock pin 73.

The link pin 52 is fitted with a loop 53 or other termination which is adapted to fit into the detent 67 in the disc 66.

In operation, the disc is rotated through 90° so that the detent 67 is located at the top. The loop 53 in the link pin 52 is pulled upwardly and set in the detent 67. The action of pulling up the link pin 52 causes the center portion of the floor to be raised. The gravitational forces acting on the floor through the link pin 52 causes the disc 66 to remain in the top position.

At this time, the doors or end covers are slid upwardly and the lock pins 73 are releasably engaged in the door. Since the disc 66 has moved from a position wherein the holes 68 and 69 are aligned vertically to a position wherein the holes 68 and 69 are aligned horizontally, some slack is created in the flexible connectors 75. This slack is just sufficient for the lock pins 73 to project beyond the end of the top 11 and into the holes 80 in the doors thereby restraining the doors in a raised position.

Additional weight on the floor panels 43 or 44, such as, for example, an animal walking thereon, causes the disc 66 to rotate to its normal position. The action is enhanced by the spring 63 which was put into a torsionally compressed state by the act of the ¼ revolution in the trap setting step. The rotation of the disc 66 causes the flexible connector 75 to be pulled thereby pulling the lock pins 73 out from the door holes 80 permitting the doors to drop to a closed position.

It is obvious that suitable bait can be set on the outer floor section 16 in order to entice an animal into the chamber. Additionally, a hook 54 may be attached to the link pin at the top of the inside of the chamber for the purpose of hanging a suitable bait. Thus, even if an animal does not step on the center section but takes the bait from the hanging hook 54, the trap will be triggered.

It is apparent therefor that an animal entering into the chamber will be well removed from either door at the time the trap is triggered. Thus, the closing doors will not injure the animal.

Figure 2:
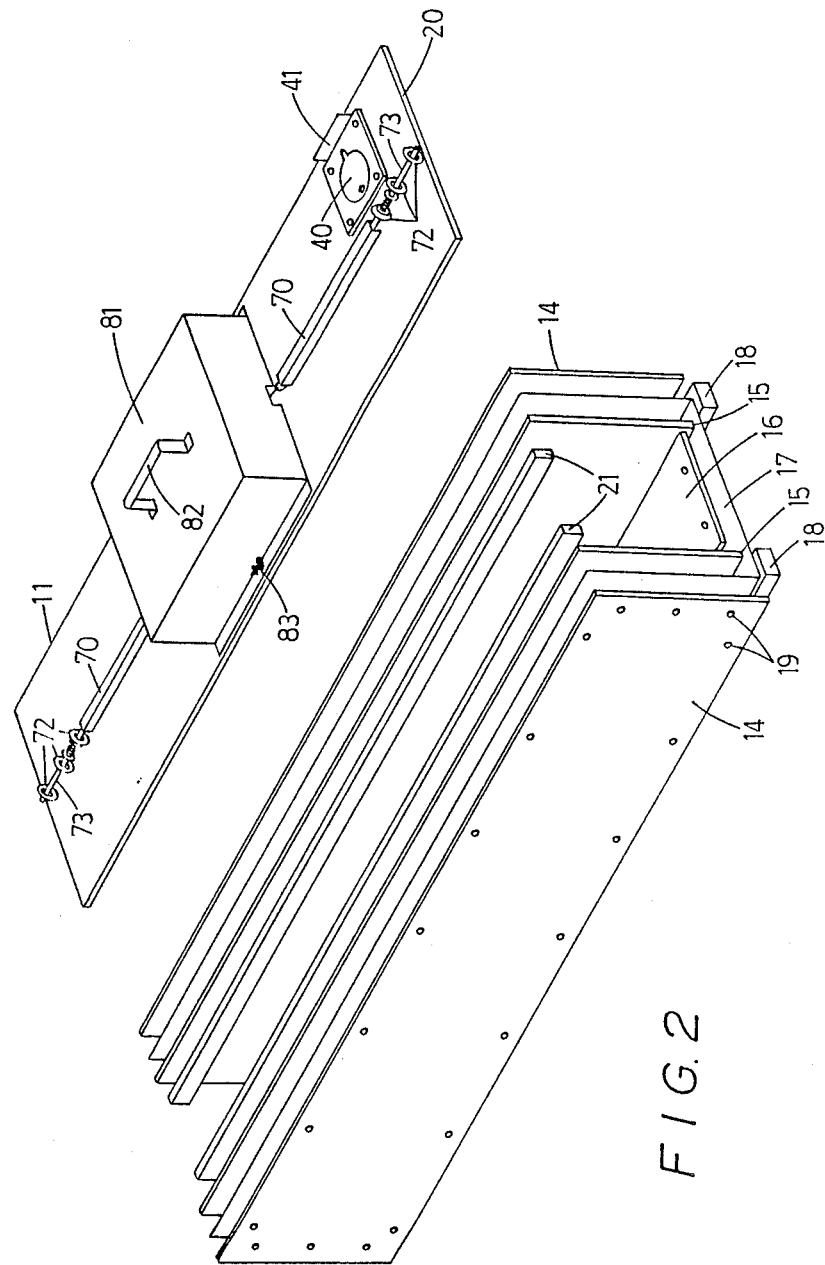
FIG. 2 is an exploded perspective view of the chamber.

To prevent accidental triggering of the trap mechanism, a rectangular covering 81, as shown in FIG. 2, may be provided which preferably would include a handle 82 to facilitate carrying the trap and an easy-access mechanism, such as a wing-nut system 83, to provide access to the triggering mechanism when setting the trap.

While a preferred embodiment has been shown and described, various modifications and substitutions may be made thereto without departing from the spirit and scope of the invention as defined in the following claims.

The embodiments of the invention in which an exclusive property or privilege is claimed are defined as follows:

1. An animal trap comprising an elongate chamber having a top, a bottom and a pair of sides, a pair of end covers at least one of which is slidable vertically between a raised open position and a lowered closed position, a floor including a pair of centrally hinged panels, link means projecting upwardly from the hinged panels through an opening in said top, trap setting means including a shaft laterally disposed on said top, said shaft being rotatably connected to a pair of fastening means, a disc attached to said shaft and located over said link means, biasing means attached to said shaft and one of said fastening means, said disc including a circumferentially located detent, and a pair of diametrically opposed holes arranged 90° to said detent, at least one locking means releasably connectable to at least one of said end covers in a raised position thereof, said locking means being connected to one of said holes in said disc by a flexible attachment, and a connecting loop joined to said link means and adapted to rest in said detent when said detent is in a vertically uppermost position.

2. The trap according to claim 1 wherein both of said end covers are slidable vertically between a raised open position and a lowered closed position.

3. The trap according to claim 1 including locking means releasably connectable to each of said end covers.

4. The trap according to claim 2 including locking means releasably connectable to each of said end covers.

5. The trap according to claim 1 wherein one of said pair of end covers comprises an inner door and an outer door, each slidable independently.

6. The trap according to claim 5 wherein said inner door is solid and said outer door is in the form of a grill.

raising said link means thereby raising said floor panels and placing said connecting loop in said detent; and upwardly sliding at least one of said end covers and lockingly engaging the associated locking means thereto.

7. The trap according to claim 5 where both of said end covers comprise inner and outer doors.

8. The trap according to claim 6 where both of said end covers comprise inner and outer doors.

9. The trap according to claim 1 wherein said flexible attachment is a string extending between one of said holes in said disc and said locking means and being of an appropriate length such that when said holes are aligned horizontally said locking means engages said end cover and when said disc revolves 90° said locking means disengages said end cover.

10. A method of setting a trap for trapping animals utilizing a trap having an elongate chamber having a top, a bottom and a pair of sides, a pair of end covers at least one of which is slidable vertically between a raised open position and lowered closed position, a floor including a pair of centrally hinged panels, link means projecting upwardly from said panels through an opening in said top, trap setting means including a shaft laterially disposed on said top, said shaft being rotatably connected to a pair of fastening means, a disc attached to said shaft and located over said link means, biasing means attached to said shaft and one of said fastening means, said disc including a circumferentially located detent, and a pair of diametrically opposed holes arranged 90° to said detent, at least one locking means releasably attached to at least one of said end covers in a raised position thereof, said locking means being connected to one of said holes in said disc by a flexible attachment, and a connecting loop joined to said link means and adapted to rest in said detent when said detent is in a vertically uppermost position, said method comprising the steps of:

placing bait on said floor panels; advancing said disc through 90° so that said detent is in the vertically uppermost position.

* * * * *

UNITED STATES PATENT AND TRADEMARK OFFICE
CERTIFICATE OF CORRECTION

PATENT NO. : 4,899,484
DATED : February 13, 1990
INVENTOR(S) : MORIN

It is certified that error appears in the above-identified patent and that said Letters Patent is hereby corrected as shown below:

Claim 6, column 5, lines 6-11 inclusive should be moved to follow "uppermost position" at the end of claim 10 in column 6.

Signed and Sealed this

Twelfth Day of February, 1991

*Attest:*

HARRY F. MANBECK, JR.

*Attesting Officer*  Commissioner of Patents and Trademarks